(12) United States Patent
Hall et al.

(10) Patent No.: US 8,154,664 B2
(45) Date of Patent: Apr. 10, 2012

(54) METHOD AND APPARATUS FOR DC RESTORATION USING FEEDBACK

(75) Inventors: Raymond William Hall, Riverside, CA (US); Donald E. Parreco, Covina, CA (US)

(73) Assignee: RGB Systems, Inc., Anaheim, CA (US)

( * ) Notice: Subject to any disclaimer, the term of this patent is extended or adjusted under 35 U.S.C. 154(b) by 0 days.

(21) Appl. No.: 12/861,316

(22) Filed: Aug. 23, 2010

(65) Prior Publication Data
US 2011/0069236 A1     Mar. 24, 2011

Related U.S. Application Data

(63) Continuation of application No. 11/309,558, filed on Aug. 22, 2006, now Pat. No. 7,787,057.

(51) Int. Cl.
*H04N 9/72* (2006.01)
*H04N 5/16* (2006.01)

(52) U.S. Cl. ........................ 348/692; 348/694

(58) Field of Classification Search .................. 348/691, 348/692, 694, 697, 725, 607, 624, 222.1; 725/148, 149; 345/2.1; 327/307
See application file for complete search history.

(56) References Cited

U.S. PATENT DOCUMENTS

| | | | | |
|---|---|---|---|---|
| 3,560,648 A * | 2/1971 | Kitsopoulos | .................. | 348/684 |
| 4,212,032 A * | 7/1980 | Harford | ........................ | 348/683 |
| 4,233,629 A * | 11/1980 | Dayton | ........................ | 348/532 |
| 4,516,042 A * | 5/1985 | Nakamura | .................... | 327/312 |
| 4,680,633 A * | 7/1987 | Gerdes et al. | .................. | 348/526 |
| 4,723,166 A * | 2/1988 | Stratton | ........................ | 348/620 |
| 4,918,532 A * | 4/1990 | O'Connor | ..................... | 348/726 |
| 5,389,977 A | 2/1995 | Lee | | |
| 5,410,364 A * | 4/1995 | Karlock | ........................ | 348/683 |
| 6,618,774 B1 | 9/2003 | Dickens et al. | | |
| 6,826,352 B1 * | 11/2004 | Quan | ............................ | 386/254 |
| 6,904,110 B2 * | 6/2005 | Trans et al. | ..................... | 375/350 |
| 6,977,692 B2 * | 12/2005 | Harvey | ........................ | 348/525 |
| 7,047,556 B2 * | 5/2006 | Cole et al. | ..................... | 725/149 |
| RE40,412 E * | 7/2008 | Cooper | ........................ | 348/525 |
| 2002/0129380 A1 * | 9/2002 | Orii | ............................... | 725/136 |
| 2003/0227571 A1 * | 12/2003 | Movshovish et al. | ......... | 348/691 |
| 2004/0105559 A1 | 6/2004 | Aylward et al. | | |
| 2004/0114675 A1 | 6/2004 | Crawford | | |
| 2005/0013327 A1 | 1/2005 | Koyanagi | | |
| 2005/0024109 A1 | 2/2005 | Amin | | |
| 2005/0132087 A1 | 6/2005 | Glinski et al. | | |
| 2005/0134736 A1 * | 6/2005 | Meiners | ........................ | 348/558 |
| 2005/0152463 A1 | 7/2005 | DeChamps et al. | | |
| 2006/0077303 A1 * | 4/2006 | Gudmundson et al. | ........ | 348/678 |

(Continued)

FOREIGN PATENT DOCUMENTS
GB     2247813     3/1992
(Continued)

*Primary Examiner* — Victor Kostak
(74) *Attorney, Agent, or Firm* — The Hecker Law Group, PLC

(57) ABSTRACT

A feedback circuit for restoration of DC in video signals is presented. A sample pulse representing the back porch of an incoming video signal is generated from the horizontal sync signal. The sample pulse triggers a sample and hold circuit to acquire the correct offset voltage in the output signal during this back porch period. The offset voltage feeds back through a summing node upstream of either the circuit causing the offset or an input amplifier thereby restoring the video signal to the desired DC voltage level with respect to ground.

10 Claims, 10 Drawing Sheets

U.S. PATENT DOCUMENTS

| | | |
|---|---|---|
| 2006/0224650 A1 | 10/2006 | Cousineau |
| 2007/0105514 A1 | 5/2007 | Tseng et al. |
| 2007/0248197 A1 | 10/2007 | Lee |
| 2007/0263667 A1 | 11/2007 | Dubuc et al. |
| 2007/0275674 A1 | 11/2007 | Chien |

FOREIGN PATENT DOCUMENTS

| | | |
|---|---|---|
| GB | 2429868 | 3/2007 |
| JP | 2003-17961 A | 1/2003 |

* cited by examiner

| Pin | RGBHV | RGBS | RsGsBs | RGsB | Component | S-Video | Composite |
|---|---|---|---|---|---|---|---|
| 1 | Red/V Sync + | Red + | Red/Sync + | Red + | R-Y + | | |
| 2 | Red/V Sync - | Red - | Red/Sync - | Red - | R-Y - | | |
| 3 | Digital/Power + | Digital/Power + | Digital/Power + | Digital/Power + | Digital/Power + | Digital/Power + | Digital/Power + |
| 4 | Green + | Green + | Green/Sync + | Green/Sync + | Y + | Y + | Video + |
| 5 | Green - | Green - | Green/Sync - | Green/Sync - | Y - | Y - | Video - |
| 6 | Digital/Power - | Digital/Power - | Digital/Power - | Digital/Power - | Digital/Power - | Digital/Power - | Digital/Power - |
| 7 | Blue/H Sync + | Blue/C Sync + | Blue/Sync + | Blue + | B-Y + | C + | |
| 8 | Blue/H Sync - | Blue/C Sync - | Blue/Sync - | Blue - | B-Y - | C - | |

FIG. 2

| Pin | Signals |
|---|---|
| 1 | Composite Video + |
| 2 | Composite Video - |
| 3 | Digital/Power + |
| 4 | Y + |
| 5 | Y - |
| 6 | Digital/Power - |
| 7 | C + |
| 8 | C - |

FIG. 3 ved as U.S. Pat. No. 7,787,057 on Aug. 31, 2010.

METHOD AND APPARATUS FOR DC RESTORATION USING FEEDBACK

CROSS-REFERENCE TO RELATED APPLICATION

This patent application is a continuation of U.S. patent application Ser. No. 11/309,558 filed Aug. 22, 2006, which issued as U.S. Pat. No. 7,787,057 on Aug. 31, 2010.

FIELD OF THE INVENTION

This invention relates to the field of video transmission. More specifically the invention relates to removal of DC offset errors in video transmitted over long distances.

BACKGROUND OF THE INVENTION

Cables are one method commonly used to convey electronic video signals from a source device (e.g., a video camera or a DVD player) to a destination device (e.g., a video display screen). Two types of cable commonly used for video transmission are coaxial cable and twisted pair cable. It is desirable for the video signal at the destination device to correspond accurately to the original video signal transmitted by the source device. "Insertion loss" is a term used to describe signal degradation that occurs when a video or other signal is transmitted over a transmission medium such as a cable. Insertion loss is typically caused by the physical characteristics of the transmission cable.

Typically, insertion loss is proportional to the cable length: longer length transmission cables will exhibit greater loss than shorter length cables. Coaxial cables typically exhibit less insertion loss than twisted pair cables. However, coaxial cables are more expensive and difficult to install than twisted pair cables. Twisted pair cables typically are manufactured as bundles of several twisted pairs. For example, a common form of twisted pair cable known as "Category 5" or "CAT5" cable comprises four separate twisted pairs encased in a single cable. CAT5 cable is typically terminated with an eight-pin RJ45 connector.

Video signals come in a variety of formats. Examples are Composite Video, S-Video, and YUV. Each format uses a color model for representing color information and a signal specification defining characteristics of the signals used to transmit the video information. For example, the "RGB" color model divides a color into red (R), green (G) and blue (B) components and transmits a separate signal for each color component.

In addition to color information, the video signal may also comprise horizontal and vertical sync information needed at the destination device to properly display the transmitted video signal. The horizontal and vertical sync signals may be carried over separate conductors from the video component signals. Alternatively, they may be added to one or more of the video signal components and transmitted along with those components.

For RGB video, several different formats exist for conveying horizontal and vertical sync information. These include RGBHV, RGBS, RGsB, and RsGsBs. In RGBHV, the horizontal and vertical sync signals are each carried on separate conductors. Thus, five conductors are used: one for each of the red component, the green component, the blue component, the horizontal sync signal, and the vertical sync signal. In RGBS, the horizontal and vertical sync signals are combined into a composite sync signal and sent on a single conductor. In RGsB, the composite sync signal is combined with the green component. This combination is possible because the sync signals comprise pulses that are sent during a blanking interval, when no video signals are present. In RsGsBs, the composite sync signal is combined with each of the red, green and blue components. Prior art devices exist for converting from one format of RGB to another. To reduce cabling requirements, for transmission of RGB video over anything other than short distances, a format in which the sync signals are combined with one or more of the color component signals are commonly used.

Thus, an RGB signal typically requires at least three separate cables for transmission of each of the red, green, and blue components and the combined horizontal and vertical sync information. If coaxial cable is used, three separate cables are required. If twisted pair conductors are used, three twisted pairs are also required, but a single CAT5 cable (which comprises four twisted pairs) can be used. Three of the four pairs may be used for the red, green, and blue components, respectively. The fourth pair is available for transmission of other signals (e.g., digital data, composite sync, and/or power). FIGS. 2 and 3 illustrate examples of how video signals may be allocated to the four pairs of twisted conductors in a CAT5 or similar cable.

In a CAT5 or similar cable, each end of each conductor is typically connected to one of eight pins of a standard male RJ-45 connector. In FIGS. 2 and 3, the first conductor pair corresponds to Pins 1 and 2; the second conductor pair corresponds to Pins 4 and 5; the third conductor pair corresponds to Pins 7 and 8; and the fourth conductor pair corresponds to Pins 3 and 6. For video signal configurations in which three or fewer conductor pairs are used for the transmission of the video signal, the remaining conductor pair or pairs (for example, the pair corresponding to Pins 3 and 6), may be used for communication of other signals, and/or for power transfer. Power transfer may be desirable if one of the devices is located remote from an external power source. For example, a source device may comprise a self powered laptop computer located at a distance from an external power source, such as a power outlet, while the destination device comprises a video projector display unit located in the ceiling of a room with a readily available AC power source. In such a configuration, the power needed to operate the transmitter may be conveyed from the receiver located near an AC power source via the twisted conductor pair not allocated for transmission of video signals. In such a configuration, the transmitter may be located within a wall or podium (e.g. in the vicinity of the laptop computer) without a nearby power source thus the transmitter can get its power from the receiver which is more likely to have a power source nearby.

FIG. 2 shows example pin configurations for a number of video signal formats. For example, with RGBHV video, as shown in the column headed "RGBHV" of FIG. 2, the twisted pair corresponding to Pins 1 and 2 carries the differential Red signals (i.e. Red+ and Red−) and the differential vertical sync signal (i.e. V Sync+ and V Sync−), the pair corresponding to Pins 4 and 5 carries the differential green signals (i.e. Green+ and Green−), and the pair corresponding to Pins 7 and 8 carries the differential Blue signals (i.e. Blue+ and Blue−) and the differential horizontal sync signal (i.e. H Sync+ and H Sync−). In FIG. 2, the conductor pair corresponding to pins 3 and 6 is allocated to carrying a digital signal and power.

For RGBS (i.e. RGB with one composite sync signal), in the example of FIG. 2, as shown in the column headed "RGBS," the same pin assignments are used for the red, green and blue components as for RGBHV, with the composite sync signal combined with the Blue signal (i.e. Blue/C Sync+ and Blue/C Sync−). The composite sync signal could alternatively be combined with the Red component signal, or the Green component signal (as is done in the RGsB format, as shown in the column headed "RGsB" in FIG. 2). When the format to be transmitted is RsGsBs (i.e. composite sync signal added to each color component), as shown in the column headed "RsGsBs" in FIG. 2, the same pin assignments are used for each of the red, green and blue components as for RGBHV, except in this case the composite sync signal is added to each of the three color components.

In addition to showing example pin assignments for RGB signals, FIG. 2 also shows example pin assignments for component video, S-Video, and composite video. FIG. 3 shows an example of pin assignments that allow Composite video and S Video signals to share the same four-twisted pair cable.

Video standards require the regions known in the art as the front porch and back porch, i.e., the signal level before and after the horizontal synchronization pulse, to be at a DC ground level. However, it is common to find video sources with signals not referenced to ground. For instance, the video signal may be floating or biased above or below ground. Prior art systems use methods such as AC (e.g. capacitive) coupling to remove this undesirable DC bias.

However, AC coupling allows for a very large DC offset error on the input and distorts the video signal. The signal drifts up and down around it's bias point depending on video signal content. Also the video may be distorted (field tilt) due to the RC time constant inherent in such a circuit. To minimize the field tilt often large capacitor and resistor values are used which slow down the response time of the DC restore circuit. Therefore, capacitive coupling and other methods of prior art have drawbacks which degrade video quality and DC restore response time.

SUMMARY OF THE INVENTION

The invention comprises a method and apparatus for automatically restoring DC in video signals using feedback. The present invention is particularly applicable to the transmission of video over long lengths of twisted pair conductors. Embodiments of the invention may be implemented as a separate device and/or as part of a video transmission system that provides other types of signal compensation and equalization as well.

In one embodiment of the present invention, the transmitter comprises a DC restore circuit which clamps the video signal with respect to ground. Clamping of the video signal with respect to ground in the transmitter allows for use of the full dynamic range when processing the video signal for transmission over the twisted pair conductor. For instance, the characteristics of a reference signal used for signal recovery may not need to vary with the video signal clamped to ground; thus reducing the complexity of the receiver circuit.

In one or more embodiments, the receiver circuit also comprises a DC restore circuit to maximize compatibility of the output video signals with subsequent video equipments.

Further objects, features, and advantages of the present invention over the prior art will become apparent from the detailed description of the drawings which follows, when considered with the attached figures.

BRIEF DESCRIPTION OF THE DRAWINGS

FIG. 2 is an illustration of allocation of the conductors of a twisted pair cable for various video formats in accordance with an embodiment of the present invention.

FIG. 3 is an illustration of allocation of the conductors of a twisted pair cable for video signals in accordance with an embodiment of the present invention.

DETAILED DESCRIPTION OF THE INVENTION

The invention comprises a method and apparatus for restoration of DC in video transmitted over long distances using twisted pair conductors. In the following description, numerous specific details are set forth to provide a more thorough description of the present invention. It will be apparent, however, to one skilled in the art, that the present invention may be practiced without these specific details. In other instances, well-known features have not been described in detail so as not to obscure the invention.

In one or more embodiments, a transmitter is configured to transmit video signals over multiple conductor pairs to a receiver. Each conductor pair carries a component of the video signal. The transmitter obtains input video signals from a video source device (e.g. a video camera or a DVD player). In one or more embodiments, the transmitter modifies the input video signal by restoring the DC to ground reference and adding a reference signal having a predetermined form to each component of the input video signal. The transmitter transmits the modified input video signal over the multiple conductor pairs to the receiver. The receiver processes the modified input video signal and provides a reprocessed video signal to a destination device (e.g. a video recorder or video display). In one or more embodiments, the reference signal comprises a horizontal sync signal of the input video signal.

Processing of each component of the modified video signal at the receiver is done based on the reference signal. In one embodiment, when the receiver is coupled to the transmitter via the conductor pairs, the receiver recognizes that a signal is present at its input terminals and begins processing of the input signal. The receiver attempts to detect the reference signal in each signal component. In one or more embodiments, the receiver comprises a closed loop signal amplifier for each signal component. The receiver initially sets the loop gains of the amplifiers to maximum for purposes of detecting the reference signal. In one or more embodiments, once the reference signal is detected in a particular signal component, the receiver adjusts the DC and/or AC signal amplitude and peaking for that signal component until the reference signal is restored to its original form.

At a point early in the signal adjustment process where the reference signal starts to be detected, DC restore circuits in the receiver automatically starts to measure the DC level of the video signal at the back porch and adjust the video signals accordingly. The resulting output video is compatible with multiple display systems. In one or more embodiments, DC restore employs a closed loop feedback system around the video signal which automatically clamps the signal with respect to ground.

Figure 1:
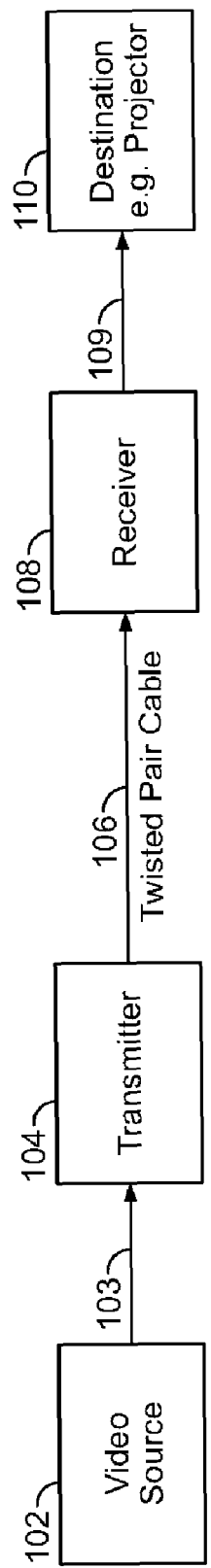
FIG. 1 is an illustration of long distance twisted pair transmission apparatus in accordance with an embodiment of the present invention.

An embodiment of a video transmission system comprising the present invention is illustrated in FIG. 1. The video transmission system of FIG. 1 comprises video source 102, cable 103, transmitter 104; twisted pair cable 106; receiver 108, cable 109 and destination device 110. Cable 103 couples the video (and audio, if applicable) signals from source 102 to transmitter 104. Cable 103 may comprise any suitable conductors known in the art for coupling the type of video signal generated by video source 102 to transmitter 104. Transmitter 104 comprises multiple input terminals for accepting different input signal formats. For example, transmitter 104 may comprise connectors for accepting a composite video signal, an S-Video signal, a digital video signal, an RGB component video signal, etc. Transmitter 104 may also comprise standard audio connectors such as, for example RCA input jacks.

In one or more embodiments, cable 106 comprises a cable bundle of multiple twisted pair conductors. For example, cable 106 may comprise a CAT5 or similar cable comprising four pairs of twisted conductors and terminated with standard male RJ-45 connectors that mate with matching female RJ-45 connectors on the transmitter and receiver. The pairs of twisted conductors may, for example, be allocated as shown in FIGS. 2 and 3.

Example embodiments of the present invention are described using RGBHV as an example video input signal format. However, it will be clear to those of skill in the art that the invention is not limited to RGBHV and other RGB video formats but may be used with any video format in which the video signal is transmitted over at least one conductor pair.

Figure 4:
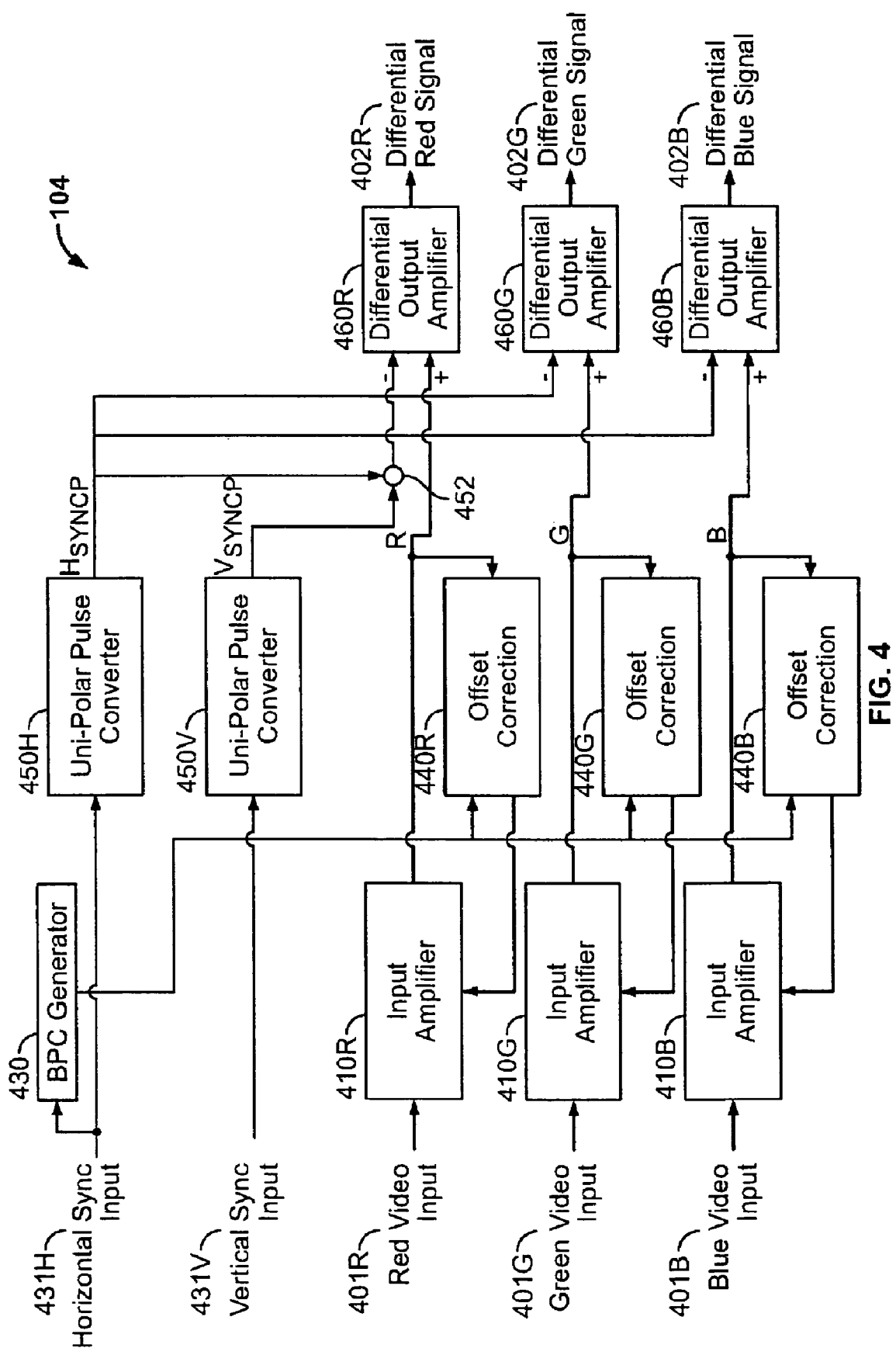
FIG. 4 is a block diagram illustration of architecture of a transmitter in accordance with an embodiment of the present invention.

FIG. 4 is a block diagram showing the architecture of transmitter 104 of FIG. 1 in an embodiment of the present invention. In the embodiment shown in FIG. 4, transmitter 104 receives a video source signal comprising separate video input signals and sync input signals. For example, if the video input source signal is in RGBHV format, video input signals comprise the R, G and B signals, while the sync input signals comprise the H and V sync signals. In other embodiments, the sync signals may be combined with one or more of the video component signals.

In embodiments configured for S-Video; Component video; or RGB video with a combined synchronization signal, the synchronization signals may be detected and extracted from the video information and then re-combined, after conditioning, with the video to provide the appropriate reference signals for skew measurements. In such embodiments, the synchronization signals are stripped from the incoming video signals, conditioned, and then recombined with the appropriate video data, in the transmitter. Thus, configured, the input signal at the receiver provides the necessary information for the receiver to detect and compensate for skew, and also re-generate the appropriate synchronization signals for these video formats.

In the RGBHV embodiment of FIG. 4, transmitter 104 comprises horizontal and vertical sync input terminals 431H and 431V, red, green and blue video input terminals 401R, 401G and 401B, input amplifiers 410R, 410G, and 410B, back porch clamp (BPC) generator 430, offset correction circuits 440R, 440G, and 440B, uni-polar pulse converters 450H and 450V, differential output amplifiers 460R, 460G and 460B, and differential output terminals 402R, 402G and 402B. Transmitter 104 may also contain local output amplifiers for each input signal (not shown) that provide a local video monitor output signal.

Input amplifiers 410 receive the input video signal from video input terminals 401, and two uni-polar pulse converters 450 receive the sync input signal from sync input terminals 431. Separate amplifiers are preferably utilized for each video component signal. For example, an RGBHV input signal requires three input amplifiers 410 for the video components (one each for the R, G, and B components) and two uni-polar pulse converters 450 for the sync (one each for the H and V sync signals).

Figure 9:
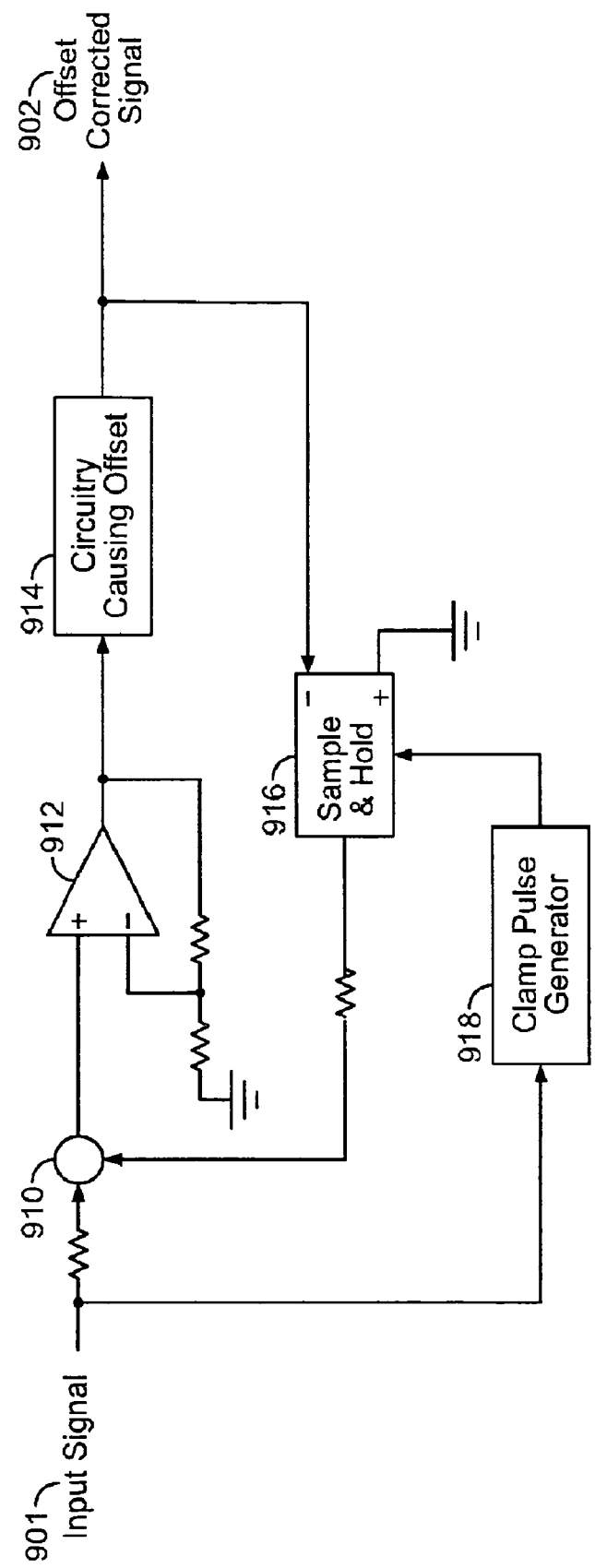
FIG. 9 is an illustration of the DC offset correction circuit in accordance with an embodiment of the present invention.

Input amplifiers 410 are used in conjunction with horizontal sync BPC generator 430 and offset correction circuits 440 to detect and compensate for any DC offset in the source video signal. In the embodiment of FIG. 4, offset correction circuits 440 determine the DC offset for each video component using the back porch clamp signal from the BPC generator 430, and the amplified video source signal from input amplifiers 410. Offset correction circuits 440 apply compensation to each video component via a feedback loop comprising the respective input amplifier 410 for that component. An embodiment of a DC offset correction circuit is illustrated in FIG. 9.

The vertical and horizontal synchronization signals 431H and 431V are inputs for the uni-polar pulse converters 450. Uni-polar pulse converters 450 assure that sync signals output by transmitter 104 are always the same polarity regardless of the polarity of the input. An embodiment of a uni-polar pulse converter 450 is illustrated in FIG. 5.

Figure 5:
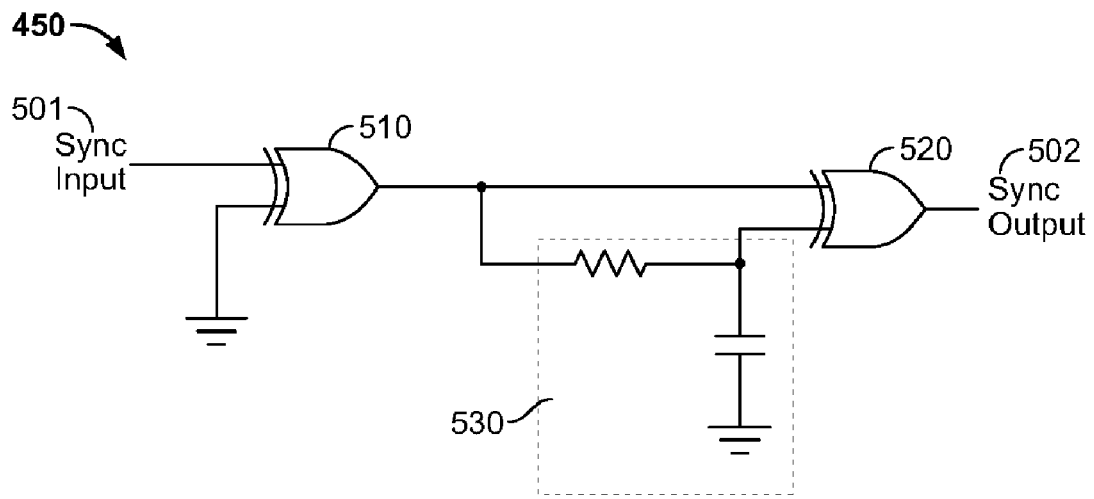
FIG. 5 is an illustration of a polarity converter in accordance with an embodiment of the present invention.

In the embodiment of FIG. 5, pulse converter 450 comprises essentially two exclusive-OR gates (e.g. 510 and 520) that process the received sync input signal. Initially, the sync input signal 501 (e.g. 431H and 431V) is exclusive-ORed with ground in gate 510 and then the output of gate 510 is filtered in low-pass filter 530 (which may comprise a resistor and capacitor circuit) and exclusive-ORed with itself (i.e. unfiltered output of gate 510) in gate 520 to generate the polarity-corrected sync output signal 502.

In the embodiment of FIG. 4, the polarity-corrected horizontal and vertical sync signals from uni-polar pulse converters 450 are subsequently mixed at summing junctions 452 with the vertical sync attribute being of greater amplitude than the horizontal sync signal. The summed sync signal is fed into the negative input of the differential output amplifier 460 while the video from the input amplifier 410 is fed into the positive input of the differential output amplifier 460.

In one or more embodiments, the horizontal sync signal $H_{SYNCP}$ is used as both the horizontal sync signal and as the reference pulse signal, which is used in the receiver for skew correction. Thus, $H_{SYNCP}$ is injected into each of the video signal components simultaneously. In addition, the vertical sync signal $V_{SYNCP}$ is also added to the appropriate one of the video components. In the embodiment of FIG. 4, $H_{SYNCP}$ is summed with $V_{SYNCP}$ and subtracted (added to the negative input) of the red video component at the differential amplifier 460R; $H_{SYNCP}$ is subtracted from the green video component at differential amplifier 460G; and $H_{SYNCP}$ is subtracted from the blue video component at differential amplifier 460B. In effect a negative reference pulse is simultaneously added to all three differential video output signals.

Differential output amplifiers 460 receive the reference, sync (if applicable) and video signals and provide corresponding amplified differential driver signals to differential output terminals 402. In one or more embodiments, differential output terminals 402 comprise a female RJ-45 connector using pin assignments such as those shown in FIG. 2 (pins 3 and 6 may be used for transmission of power, digital signals, and/or audio signals). Differential output terminals 402 may be connected via twisted pair cable 106 of FIG. 1 to receiver 108.

Figure 6:
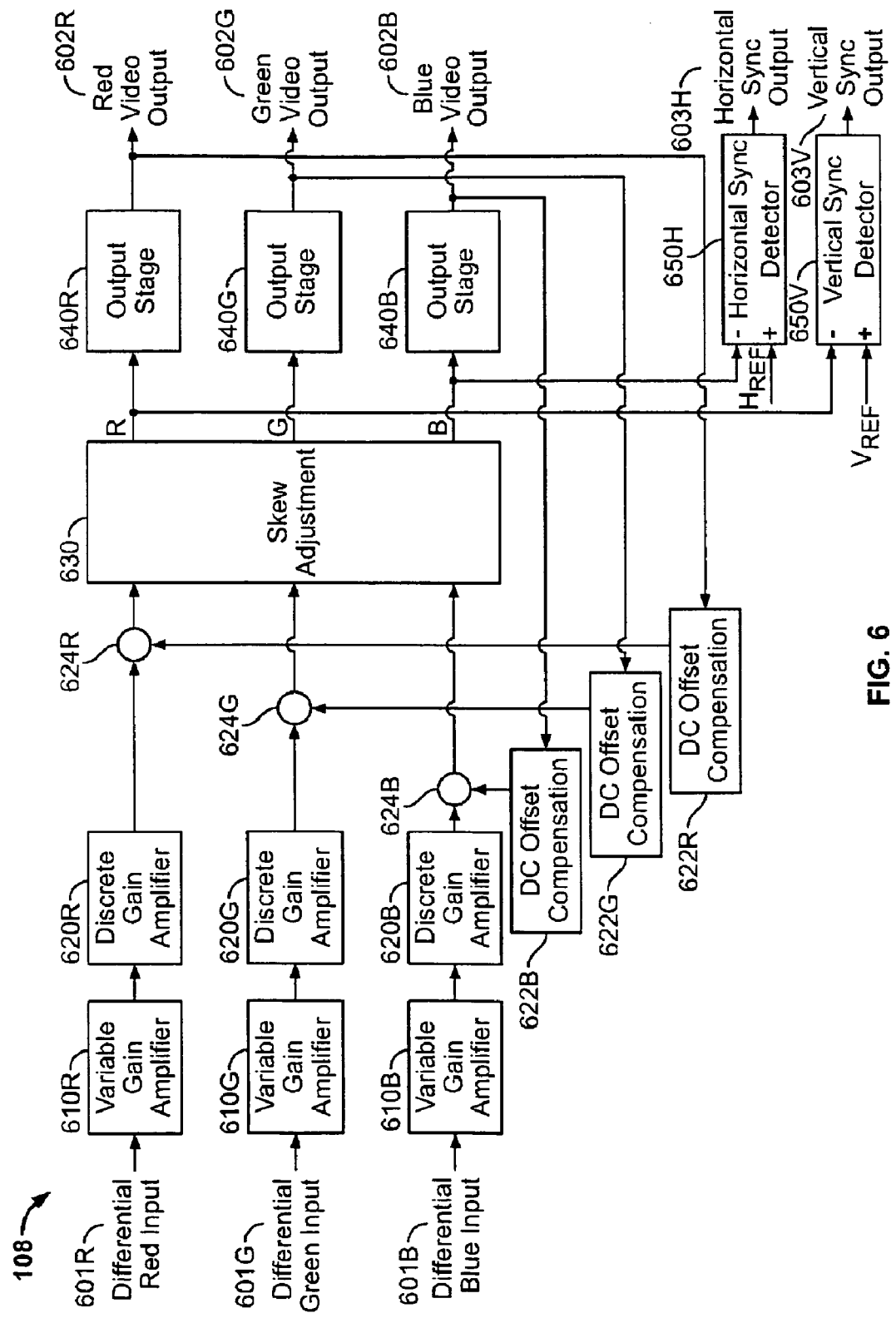
FIG. 6 is a block diagram illustration of architecture of a receiver in accordance with an embodiment of the present invention.

Receiver 108 receives the differential video signals from transmitter 104 via twisted pair cable 106. Receiver 108 processes the differential video signals to compensate for skew and signal degradation and then outputs the compensated video signals to a destination device such as projector 110. FIG. 6 is a block diagram of receiver 108 in accordance with an embodiment of the present invention.

As shown in FIG. 6, Receiver 108 comprises variable gain amplifiers 610; discrete gain amplifiers 620; skew adjustment circuit 630; output stages 640; DC offset compensation circuits 622; and sync detectors 650. Receiver 108 may also include differential output terminals (not shown) that output a buffered and/or amplified version of the input signals for daisy chaining to other receivers.

The differential video input signals 601 (e.g. 601R, 601G and 601B) feed to the respective variable gain amplifiers 610 and discrete gain amplifiers 620. Each variable gain amplifier 610 works together with the corresponding discrete gain amplifier 620 to compensate a respective one of the differential input video signals for DC and peaking losses resulting from communication of the signal from transmitter 104 to receiver 108 over twisted pair cable 106. In one or more embodiments, each variable gain amplifier 610 is capable of providing a controllable, variable amount of gain over a range from zero (0) to K, and each discrete gain amplifier 620 provides amplification in controllable, discrete multiples of K (e.g. 0K, 1K, 2K, etc). Together, variable gain amplifiers 610 and discrete gain amplifiers 620 provide controllable amount of variable gain over the range equal to the sum of the maximum gain of variable gain amplifiers 610 and the maximum gain of discrete gain amplifiers 620. In one or more embodiments, K represents the amount of gain typically required to compensate for signal losses over a known length of cable (e.g. 300 feet).

The amount of gain provided by variable gain amplifiers 610 and discrete gain amplifiers 620 may be controlled, for example, using a micro-controller that determines the appropriate amount of gain to be applied based on actual and expected signal strength of the reference signal included in the video signals received from transmitter 104.

Figure 8:
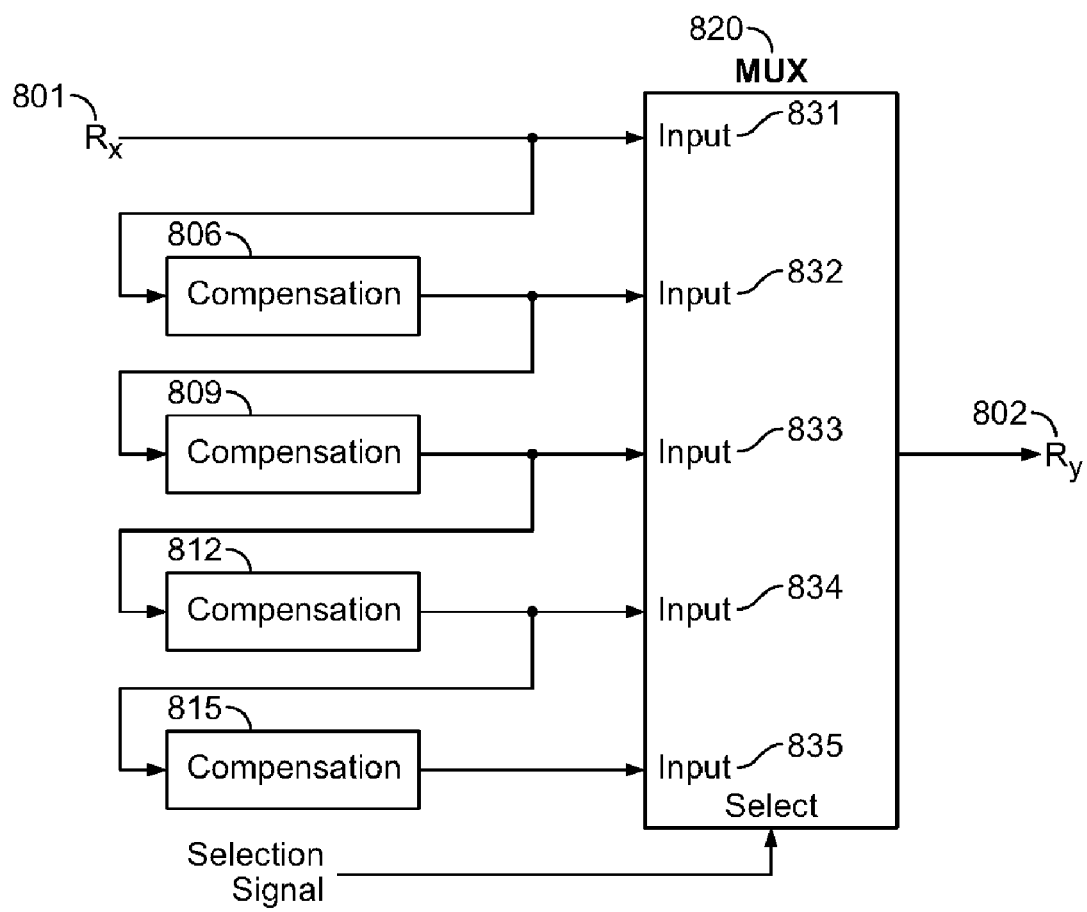
FIG. 8 is an illustration of amplifier configuration for variable length twisted pair cables in accordance with an embodiment of the present invention.

FIG. 8 shows a block diagram for a discrete gain amplifier 620 in one embodiment of the invention. In the embodiment of FIG. 8, discrete gain amplifier 620 comprises a multiplexer 820 and a plurality of compensation circuits 806, 809, 812 and 815. Each compensation circuit provides a fixed amount of gain that is approximately equal to the maximum amount of gain provided by a variable gain amplifier 610 (which may be selected, for example, to approximate the amount of gain needed to compensate for losses that occur for a nominal cable length, such as 300 feet). The compensation circuits are daisy changed, and the output of each successive compensation circuit is connected to one of the inputs of multiplexer 820.

In the embodiment of FIG. 8, input 831 of multiplexer 820 is connected to the unamplified input signal 801 (which may, for example, comprise one of the input video components 601 after it passes through a respective variable gain amplifier 610). Input 832 is connected to the output of compensation circuit 806, i.e. input signal 801 after it has been amplified by compensation circuit 806. Input 833 is connected to the output of compensation circuit 809 (i.e. input signal 801 after having been amplified by compensation circuits 806 and 809). Input 834 is connected to the output of compensation circuit 812 (i.e. input signal 801 after having been amplified by compensation circuits 806, 809 and 812). Input 835 is connected to the output of compensation circuit 815 (i.e. input signal 801 after having been amplified by compensation circuits 806, 809, 812 and 815). If K is the amount of gain provided by each compensation circuit, then the gain applied to input signal 801 will be 0K, 1K, 2K, 3K or 4K, depending on which of inputs 831, 832, 833, 834 or 835 is selected.

Referring to FIG. 6, in one or more embodiments, the total amount of gain provided by variable gain amplifiers 610 and discrete gain amplifiers 620 may be selected based on the length of cable 106, or may be automatically controlled, as described in co-pending U.S. patent application entitled "Method And Apparatus For Automatic Compensation Of Video Signal Losses From Transmission Over Conductors", No. 11/309,122, specification of which is herein incorporated by reference.

In the embodiment of FIG. 6, the gain-compensated input signals 601 are further compensated for DC offset using DC offset compensation circuits 622 and for skew using skew adjustment circuit 630.

Skew compensation is performed through Skew Adjustment circuit 630. Skew adjustment is accomplished by first recovering the reference (e.g. Horizontal Sync) signal from each video output component, for instance, at the output of Skew Adjustment circuit 630. The recovered sync signals may be subsequently used in a controller (e.g. a Micro-Controller) to determine the appropriate amount of delay to apply through Skew Adjustment circuit 630.

Skew adjustment is described in more detail in co-pending U.S. patent application Ser. No. 11/309,120, entitled "Method And Apparatus For Automatic Compensation Of Skew In Video Transmitted Over Multiple Conductors", the specification of which is incorporated by reference herein.

In one or more embodiments, the circuit comprising video output amplifiers 640 and skew adjustment circuit 630 are continuously compensated for DC offset using DC offset compensation circuits 622.

Referring back to FIG. 6, each DC offset compensation circuit 622 comprises a feedback loop around skew adjustment circuit 630 and video output amplifiers 640. The DC offset compensation circuit 622 for each respective color component signal (i.e. 622B, 622G or 622R) measures the signal offset at the respective output amplifier 640 to generate a correction signal. The DC offset may be due to the structure of the skew delay compensation & amplifier gain stages required to restore the video signal, for example. The correction signal feeds back and sums with the respective gain compensated video signal (from the respective discrete amplifier 620) in respective summing node 624.

DC restore may be applied in both the transmitter and receiver. Throughout this specification, DC restore is referred to interchangeably as Offset Correction and DC offset compensation. For instance, the DC restore circuit in the transmitter is indicated as Offset Correction circuit 440 (see FIG. 4) while DC restore circuit in the receiver is referred to as DC Offset Compensation circuit 622 (see FIG. 6). DC restore, or clamping of the video signal with respect to ground, in the transmitter may be necessary since video from some input sources are either floating, or biased above or below ground. In the receiver, DC restore (or clamping of the video signal with respect to ground) may be necessary because of circuitry within the receiver that may cause DC offset.

Generally, clamping of the video signal with respect to ground involves detecting the offset voltage level. This may be accomplished in one or more embodiments of the present invention by sampling the back porch to obtain a reference for the video signal. This is because most video standards require the voltage at the back porch of all video signals to be zero. Thus, measuring the voltage level at the back porch produces an offset voltage which may be applied to the video signal through a feedback path, continuously, and until the back porch is restored (or clamped) to ground.

In order to find the back porch, embodiments of the present invention use the trailing edge of the horizontal sync signal to start sampling of the video signal to determine the back porch DC level. For instance, one embodiment may employ circuitry designed to handle various video formats to generate a sample pulse (or Clamp Pulse) at the back porch. This clamp pulse may subsequently be used to control a sample and hold circuit which samples the output video signal during the clamp pulse period and obtains an offset voltage equivalent in magnitude to the back porch voltage level, but with an opposite polarity. Thus, the offset voltage may be fed back to remove the DC offset error in the video signal. FIG. 9 is an illustration of a DC restore circuit in accordance with an embodiment of the present invention.

Figure 10:
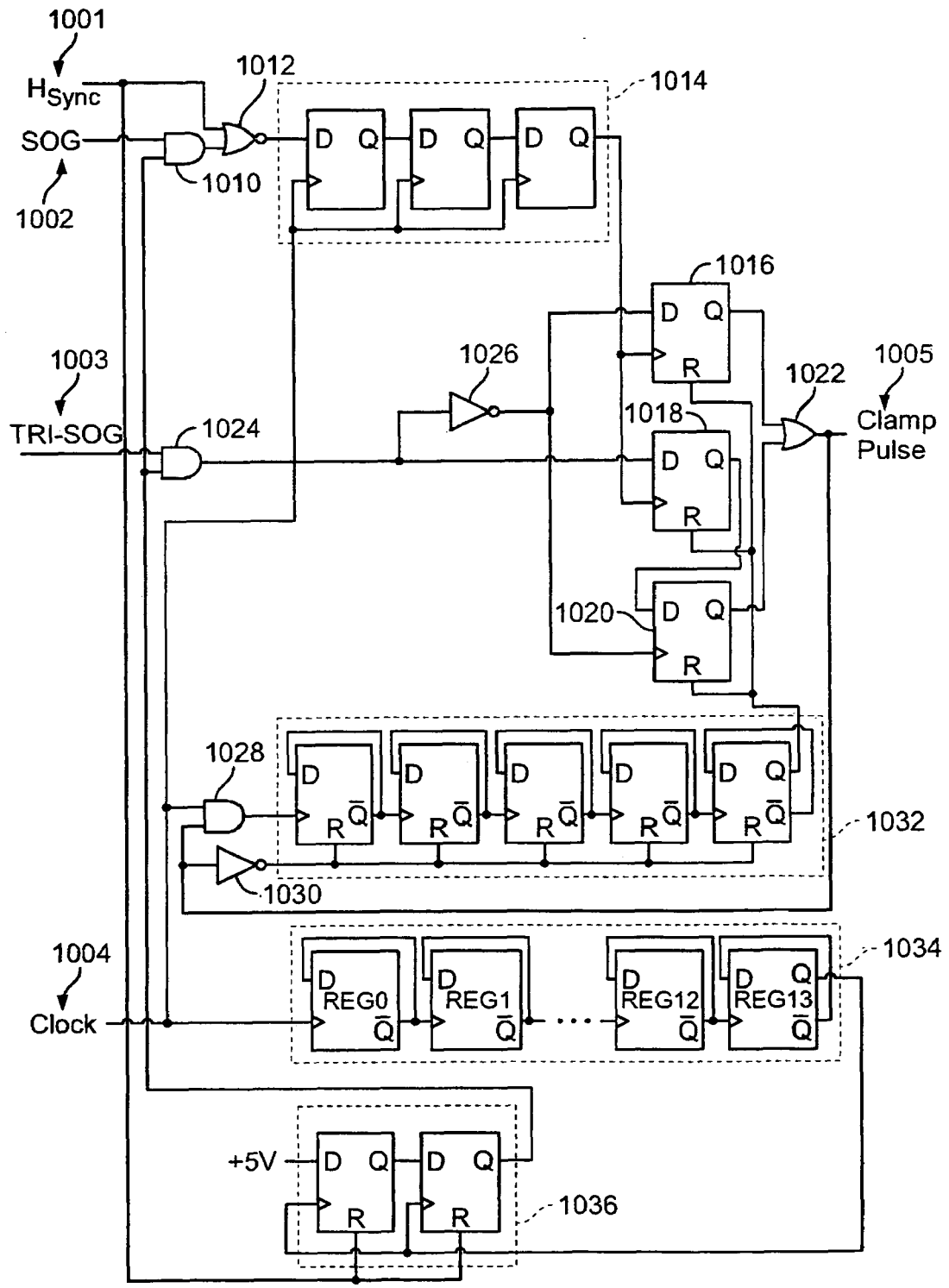
FIG. 10 is an illustration of a Clamp Pulse generator in accordance with an embodiment of the present invention.

As illustrated, the DC restore circuit comprises: summing node 910; amplifier 912; Circuitry Causing Offset 914; Sample & Hold circuit 916; and Clamp Pulse Generator circuit 918. The DC restore circuit operates on Input Signal 901 to generate the clamped video signal, Offset Corrected Signal 902. The offset signal (i.e. output of Sample & Hold circuit 916) is generated when the clamp pulse is received from Clamp Pulse generator 918. A block diagram illustration of Clamp Pulse generator 918 is illustrated in FIG. 10.

The Clamp Pulse generator may be configured to operate on a variety of video sync configurations. As illustrated in FIG. 10, in video processing where the horizontal sync signal is independently available (e.g. RGBHV or RGBS), the horizontal sync signal (i.e. $H_{Sync}$ 1001) may be coupled to an input of the clamp pulse generator. However, in configurations where the horizontal sync is not independently available, the Sync signal may be obtained from the green color component, generally refer to as Sync-On-Green (SOG). The Sync-On-Green input signals, SOG 1002 and TRI-SOG 1003, may be generated using the circuit illustrated in FIG. 11.

Figure 11:
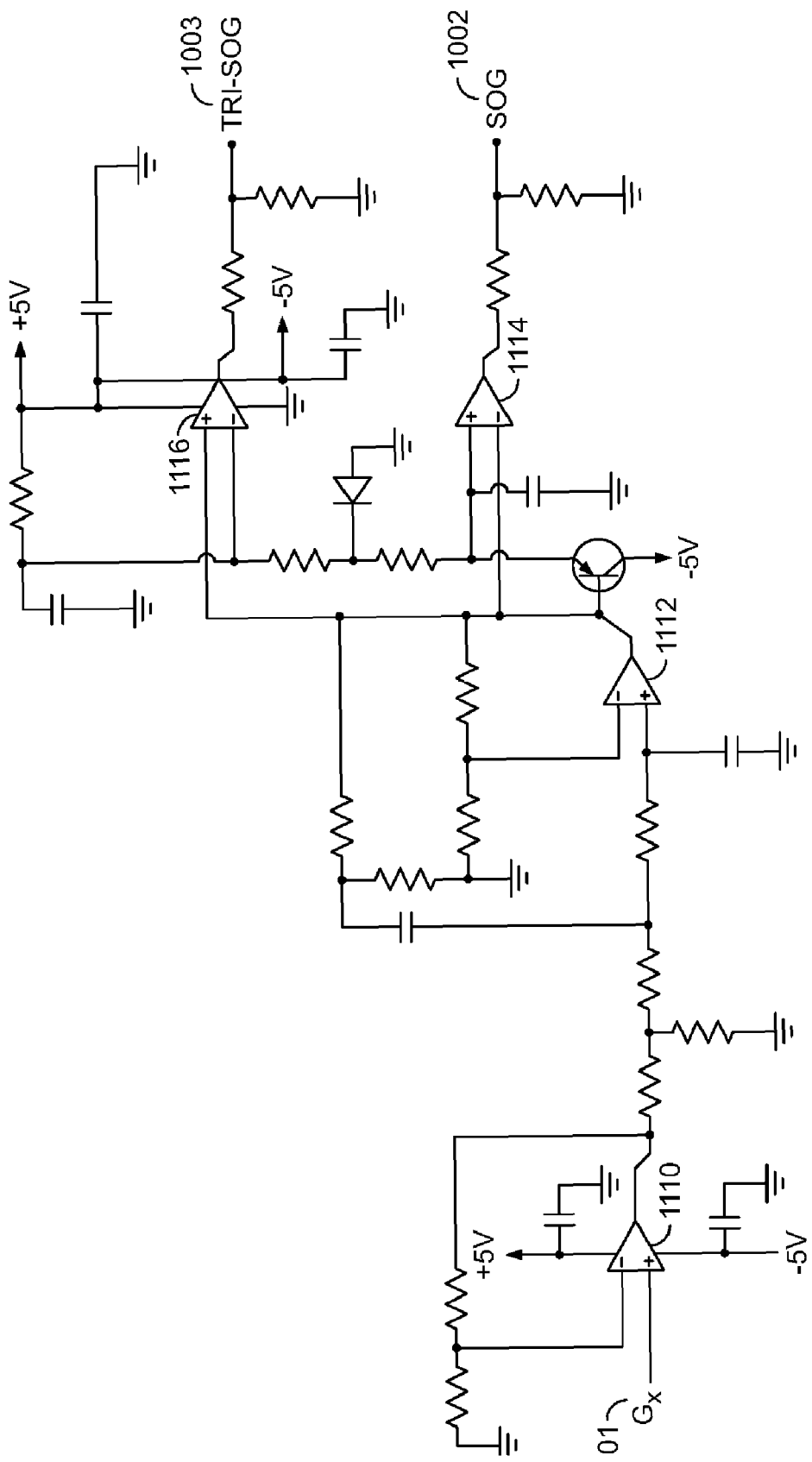
FIG. 11 is an illustration of sync signal generation circuit from the green video input component in accordance with an embodiment of the present invention.

As illustrated in FIG. 11, the green video signal, $G_X$ 1101, is buffered at amplifier 1110. When the green video signal includes the normal sync signal, the circuit comprising amplifiers 1112 and 1114 detects the normal sync pulse and produces a pulse corresponding to the sync signal at output SOG 1002. However, if the green video signal includes a tri-level sync signal (e.g. in some high definition video), then the circuit comprising amplifiers 1112 and 1116 will produce a pulse at output TRI-SOG 1003 at the second half of the tri-level sync signal, in addition to and after the pulse at SOG 1002, which represents the normal sync pulse. Thus, video with tri-level sync signals will result in a pulse at SOG 1002 and a pulse at TRI-SOG 1003. Generally, there is a finite delay between the trailing edge of the pulse at SOG 1002 and the rising edge of the pulse at TRI-SOG 1003.

Referring back to FIG. 10, the clamp pulse generator is basically accomplished with counters and logic gates. As illustrated, when there is a horizontal sync signal, the input signal $H_{Sync}$ 1001 resets the plurality of registers 1036 so that its output disables AND gates 1010 and 1024, which couples in the Sync-On-Green signals, SOG 1002 and TRI-SOG 1003, for alternate clamp pulse generation. With gates 1010 and 1024 disabled, the horizontal sync signal, $H_{Sync}$ 1001, is inverted in NOR gate 1012 and delayed (e.g. 40 to 60 nanoseconds) in plurality of registers 1014. Those of skill in the art would appreciate that, although included herein, delay registers 1014 may not be necessary in the normal $H_{Sync}$ video configuration.

Output of registers 1014 subsequently clocks register 1016 which outputs the clamp pulse for the normal $H_{Sync}$ configuration (i.e. output of register 1016). Input "D" of register 1016 remains high since it is the output of inverter 1026, which is high in this configuration. The width of the clamp pulse is controlled by output of plurality of registers 1032 which is coupled to the reset port ("R") of register 1016. Plurality of Registers 1032 is essentially a delay circuit which starts counting the external clock cycles, CLOCK 1004, through AND gate 1028 when Clamp Pulse 1005 goes high. Delay Registers 1032 are reset through inverter 1030 when Clamp Pulse 1005 goes low. The above processing occurs when horizontal sync is present, e.g. RGBHV video format.

However, when there is no horizontal sync signal (e.g. high definition video) the circuit automatically switches over to look at the Sync-On-Green signals. The automatic switching occurs by controlling gates 1010 and 1024 using the known characteristic of the horizontal sync signal. For example, since the horizontal sync period normally occurs in less than 0.32768 milliseconds, a clock signal having a cycle approximately greater than the $H_{Sync}$ period (e.g. 0.32768 milliseconds) may be used to clock the plurality of registers 1036, which enables AND gates 1010 and 1024. This clock signal may be generated using a plurality of registers 1034 which is clocked by an external clock, CLOCK 1004 (e.g. 50 MHz), and configured to generate a clock with a period approximately equal to the desired 0.32768 milliseconds.

With gate 1010 enabled, normal sync signal SOG 1002, is inverted in NOR gate 1012 and delayed (e.g. 40 to 60 nanoseconds) with the plurality of registers 1014. This delay may be necessary for the tri-level sync configuration (discussed below) to account for any delay between SOG 1002 and TRI-SOG 1003. Output of registers 1014 subsequently clocks registers 1016 which outputs the clamp pulse for the normal SOG configuration (i.e. output of register 1016). Input "D" of register 1016 remains high since it is the output of inverter 1026, which is high because TRI-SOG is low. As discussed above, the width of the clamp pulse is controlled by output of plurality of registers 1032 which is coupled to the reset port ("R") of register 1016.

In the tri-level sync configuration, AND gate 1024 is also enabled along with AND gate 1010. In such configuration, the normal clamp pulse generation for the sync signal SOG 1002 through gate 1012, delay registers 1014, and register 1016 is disabled. As illustrated, the output of inverter 1026, which is low because TRI-SOG is high, disables the normal clamp pulse path at the "D" input of register 1016. In addition, output of delay registers 1014 clocks the output of register 1018 to high since TRI-SOG is connected to the "D" input of register 1018 via AND gate 1024. The output of Register 1020 is subsequently clocked high when the TRI_SOG signal goes away by output of inverter 1026. Thus, when input signal TRI-SOG 1003 becomes inactive, output of register 1020 goes high thereby resulting in the clamp pulse for the tri-level configuration.

As discussed above, the width of the clamp pulse generated at output of register 1020 is controlled by the output of plurality of registers 1032 which is coupled to the reset port ("R") of registers 1018 and 1020. The output of the clamp pulse circuit, Clamp Pulse 1005, is generated by ORing the outputs of register 1016 and register 1020 in gate 1022.

Those of skill in the art will appreciate that the clamp pulse generator circuit and other circuits illustrated herein may be represented with discrete hardware devices or programmed in software, where appropriate. For instance, a Field Programmable Gate Array (FPGA) may be used to implement the circuit illustrated in FIG. 10.

Figure 12:
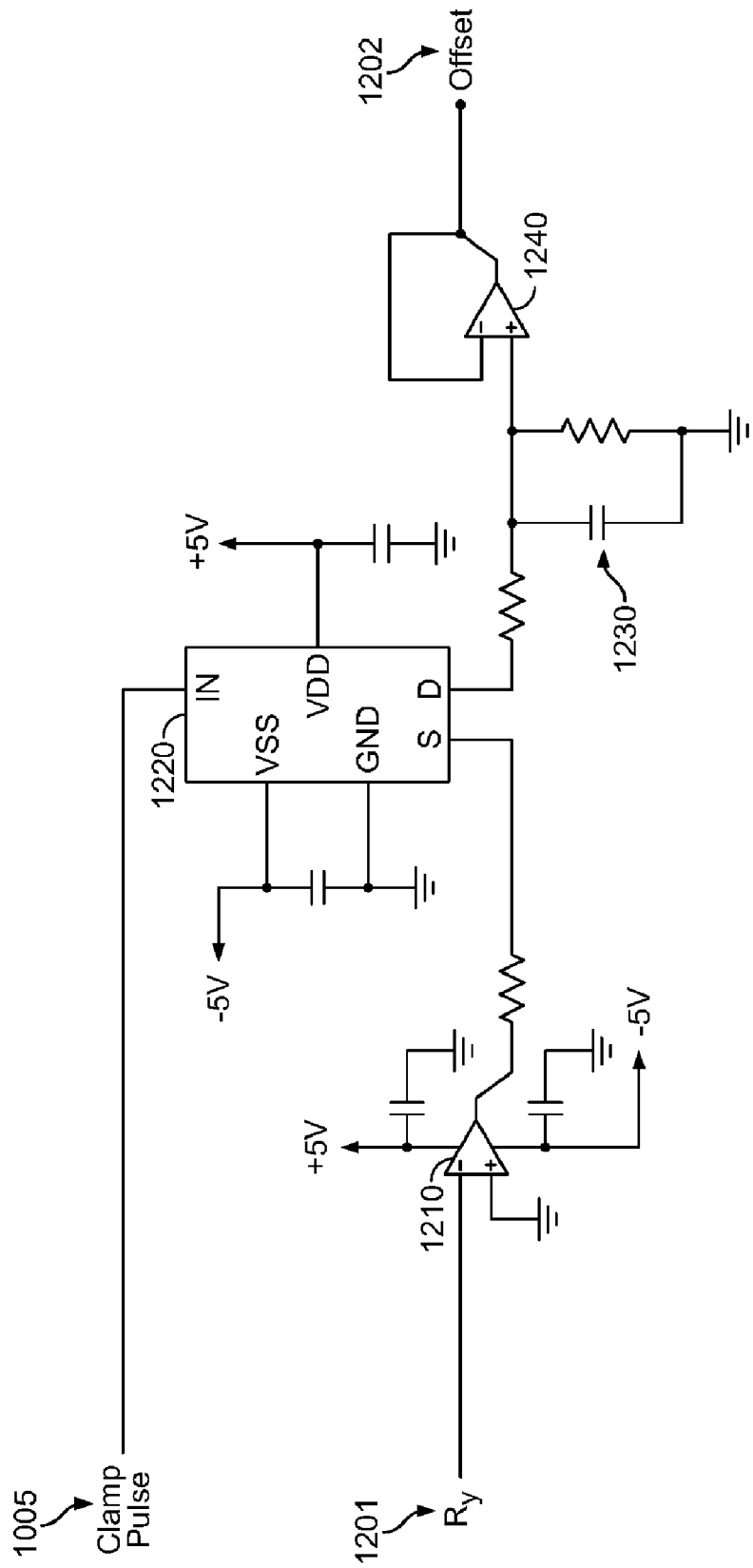
FIG. 12 is an illustration of a Sample & Hold circuit in accordance with an embodiment of the present invention.

Referring back to FIG. 9, the output of the Clamp Pulse generator 918, e.g. clamp pulse 1005, controls the switching action in the Sample & Hold circuit 916. FIG. 12 is an illustration of a Sample and Hold circuit in accordance with an embodiment of the present invention. As illustrated, the video output signal, e.g. $R_Y$ 1201, is coupled to the negative terminal of amplifier (i.e. buffer) 1210 thereby resulting in a change of polarity of the video signal. The buffer also acts to prevent any interference with the actual video signal by the sample and hold circuit.

The output of inverting buffer 1210 is coupled to the "S" terminal of switch 1220. The output of switch 1220, i.e. terminal "D", is coupled to one terminal of capacitor 1230 and to the positive terminal of amplifier 1240. The other terminal of capacitor 1230 is coupled to ground. Also, clamp pulse signal 1005 is coupled to the control terminal "IN" of switch 1220. Thus, as configured, when Clamp Pulse 1005 is "true", the switch connects the input terminal "S" to the output terminal "D" thereby causing capacitor 1230 to charge via the series resistors to the opposite level of the back porch signal. Thus resulting in a D.C. offset signal 1202, from the output of amplifier 1240, equivalent in magnitude to the voltage at the back porch, but with opposite polarity (due to the inversion at buffer 1210).

As configured, the offset voltage is continuously fed back and summed with the incoming signal (i.e. Input Signal 901) at summing node 910 thereby removing the offset from the output video signal, $R_Y$ 1201. The summing node is resistive and does not contain any capacitive coupling, thus having the benefit of no signal distortion and being able to track large DC offsets in the video signal at a much faster response time.

In one embodiment, the output signal being sampled (i.e. 902) is the output of the circuitry causing the offset (e.g. 914). In other embodiments, an offset exists in the incoming video signal, which must be corrected, thus the output signal being sampled is that of amplifier 912. In such embodiments, circuit 914 may not exist in the circuit.

Figure 7:
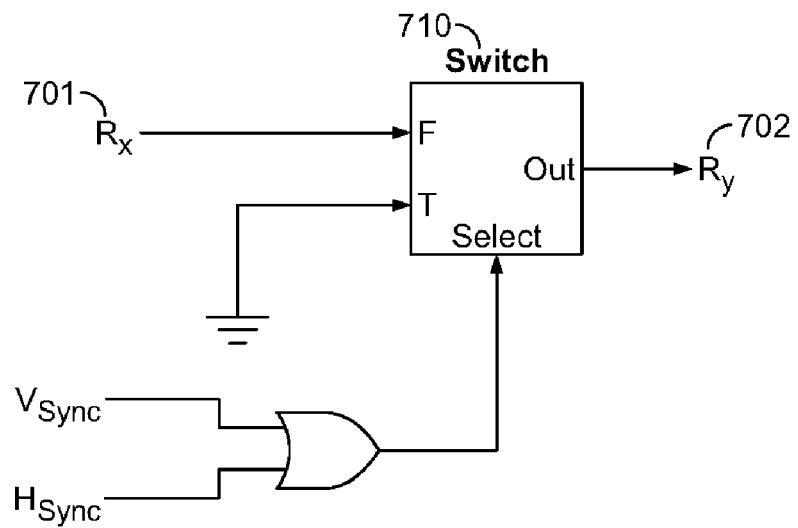
FIG. 7 is an illustration of a sync stripper circuit in accordance with an embodiment of the present invention.

Referring back to FIG. 6, output signals 602R, 602G and 602B (i.e. for RGBHV video format) are generated by stripping the sync signals (e.g. 603H and 603V) from the video signal components at respective output stages 640R, 640G and 640B. In one or more embodiments, an output stage 640 comprises a switch that grounds the video output during the sync period. When either the vertical sync (e.g. 603V) or the horizontal sync (e.g. 603H) pulse is present for any video component signal, the video output (i.e. 602) is switched to ground; otherwise, the video output is switched to the corresponding video signal output of skew adjustment circuit 630. An embodiment of a switch arrangement is illustrated in FIG. 7. In other non-RGBHV video formats the sync signals may not be stripped and/or sync signals added to re-constitute the video format being transmitted.

In FIG. 7, $R_X$ 701 is the video source from the output of skew adjustment circuit 630, and $R_Y$ 702 is the stripped video output. The vertical sync strip signal (i.e. $V_{Sync}$) is ORed with the horizontal sync strip signal (i.e. $H_{Sync}$) to generate the switch Select signal. When the Select signal is true ("T") the video output, $R_Y$ 702, is coupled to ground through switch 710 to remove the sync pulse. Otherwise, i.e. when the Select signal is false ("F"), the video output $R_Y$ 702 is coupled to the input signal, $R_X$ 701. In one or more embodiments, the vertical and horizontal sync strip signals are provided to output stages 640 via circuitry using input signals coupled to outputs of sync detectors 650H and 650V.

In the embodiment of FIG. 6, the sync pulses are detected by comparing the appropriate color component signal (e.g. the Red (i.e. $R_Y$) component for the vertical sync signal and the Blue (i.e. $B_Y$) component for the horizontal sync signal) at the corresponding output of skew adjustment circuit 630 against two reference voltage levels. A comparator may be used for such comparison. Thus, in the embodiment of FIG. 6, the vertical sync signal is generated by vertical sync detector 650V when the $R_Y$ output of skew adjustment circuit 630 meets the reference voltage threshold level ($V_{REF}$), and the horizontal sync signal is generated by horizontal sync detector 650H when the By output of skew adjustment circuit 630 meets the reference voltage threshold level ($H_{REF}$).

Thus, a novel DC restoration method and system for video transmitted over twisted pair conductors has been described. It will be understood that the above described arrangements of apparatus and methods are merely illustrative of applications of the principles of this invention and many other embodiments and modifications may be made without departing from the spirit and scope of the invention as defined in the claims. For example, although example embodiments have been described for video signals that comprise three color components transmitted over three conductor pairs, the invention can be used with any type of multi-component signal that is transmitted over any number of conductors, as will be understood by those of skill in the art.

The invention claimed is:

1. A feedback circuit for compensating for DC offset in an output signal comprising:
   a bi-level sync signal detection circuit configured to generate a bi-level sync signal detection pulse upon detection of a bi-level sync signal in said output signal;
   a first delay circuit for delaying said bi-level sync signal detection pulse a first period of time;
   a tri-level sync signal detection circuit configured to generate a tri-level sync signal detection pulse and disabling said bi-level sync signal detection pulse upon detecting a presence of a tri-level sync signal in said output signal during said first period of time;
   a clamp pulse generation circuit for generating a clamp pulse upon receiving said bi-level sync detection pulse or said tri-level sync signal detection pulse;
   a sampling circuit configured to sample said output signal during a time period of said clamp pulse to obtain a DC offset value;
   a compensation circuit for applying an inverse of said DC offset value to said input signal.

2. The feedback circuit of claim 1 wherein said input signal comprises a video signal.

3. The feedback circuit of claim 1 wherein said sampling circuit comprises a sample-and-hold circuit.

4. The feedback circuit of claim 1 wherein said first delay circuit comprises a plurality of registers.

5. The feedback circuit of claim 1 wherein said clamp pulse generation circuit comprises discrete components.

6. The feedback circuit of claim 1 wherein said claim pulse generation circuit comprises a programmable device.

7. The feedback circuit of claim 6 wherein said programmable device comprises a field programmable gate array.

8. A method for compensating for DC offset in an output signal comprising:
- generating a bi-level sync signal detection pulse upon detection of upon detection of a bi-level sync signal in said output signal;
- delaying said bi-level sync signal detection pulse a first period of time;
- generating a tri-level sync signal detection pulse disabling bi-level sync signal detection pulse upon detecting a presence of a tri-level sync signal in said output signal during said first period of time;
- generating a clamp pulse upon receiving said bi-level sync detection pulse or said tri-level sync signal detection pulse;
- sampling the output signal during a time period of said clamp pulse to obtain a DC offset value;
- subtracting said DC offset value from the input signal.

9. The method of claim 8 wherein said input signal comprises a video signal.

10. The method of claim 9 wherein said time is during a back porch of said video signal.

* * * * *